(12) United States Patent
Nielsen et al.

(10) Patent No.: US 8,067,474 B2
(45) Date of Patent: Nov. 29, 2011

(54) PROCESS FOR THE PREPARATIONN OF HYDROCARBONS FROM OXYGENATES

(75) Inventors: Poul Erik Højlund Nielsen, Fredensborg (DK); Finn Joensen, Hørsholm (DK); John Bøgild Hansen, Copenhagen (DK); Esben Lauge Sørensen, Hillerød (DK); Jørgen Madsen, Hillerød (DK); Rachid Mabrouk, Malmö (SE)

(73) Assignee: Haldor Topsøe A/S, Lyngby (DK)

( * ) Notice: Subject to any disclaimer, the term of this patent is extended or adjusted under 35 U.S.C. 154(b) by 22 days.

(21) Appl. No.: 12/725,555

(22) Filed: Mar. 17, 2010

(65) Prior Publication Data
US 2010/0240779 A1 Sep. 23, 2010

(30) Foreign Application Priority Data

Mar. 23, 2009 (DK) .................................. 2009 00397

(51) Int. Cl.
*C07C 27/00* (2006.01)
(52) U.S. Cl. ........................................ 518/700; 518/705
(58) Field of Classification Search .................. 518/700, 518/705
See application file for complete search history.

(56) References Cited

U.S. PATENT DOCUMENTS
4,481,305 A 11/1984 Jorn et al.

FOREIGN PATENT DOCUMENTS
DE 20480840 B1 4/1972
WO WO 2003-035590 A1 5/2003
WO WO 2007-020068 A1 2/2007

*Primary Examiner* — Jafar Parsa
(74) *Attorney, Agent, or Firm* — Dickstein Shapiro LLP

(57) ABSTRACT

A process for the preparation of hydrocarbon products comprising the steps of a) providing a synthesis gas comprising hydrogen, carbon monoxide and carbon dioxide; (b) reacting at least part of the synthesis gas to an oxygenate mixture comprising methanol and dimethyl ether in presence of one or more catalysts which together catalyse a reaction of hydrogen and carbon monoxide to oxygenates at a pressure of at least 3 MPa; (c) withdrawing from step (b) a reaction mixture comprising amounts of methanol, dimethyl ether, carbon dioxide and water together with unreacted synthesis gas and cooling the reaction mixture to obtain a liquid phase with the amounts of methanol, dimethyl ether and water and simultaneously dissolving carbon dioxide in the liquid phase; (d) separating the carbon dioxide containing liquid phase from a remaining gaseous phase comprising hydrogen and carbon monoxide; (e) evaporating and reacting the liquid phase being withdrawn from step (d) in presence of a catalyst being active in the conversion of oxygenates to higher hydrocarbons and a tail gas comprising carbon dioxide; (f) separating tail gas from a liquid phase with the higher hydrocarbons; and wherein pressure employed in step (c) to step (f) is substantially the same as employed in step (b).

10 Claims, 3 Drawing Sheets

PROCESS FOR THE PREPARATIONN OF HYDROCARBONS FROM OXYGENATES

BACKGROUND OF THE INVENTION

1. Field of the Invention

This invention relates to a process for the production of hydrocarbons, especially gasoline.

2. Description of the Related Art

In particular, the invention concerns a combination of process steps for the production of gasoline compounds from synthesis gas wherein carbon dioxide being present in the synthesis gas and being formed during the process is separated from the final liquid gasoline compounds.

The synthetic gasoline process is known to take place in two steps: the conversion of synthesis gas to oxygenates and the conversion of oxygenates to gasoline product. These process steps may either be integrated, producing an oxygenate intermediate, e.g., methanol or methanol dimethyl ether mixtures, which along with unconverted synthesis gas is passed in its entirety to the subsequent step for conversion into gasoline or the process may be conducted in two separate steps with intermediate separation of oxygenates, e.g. methanol or raw methanol.

Useful oxygenates include methanol, dimethyl ether and higher alcohols and ethers thereof, but also oxygenates like ketones, aldehydes and other oxygenates may be applied.

In either case conversion of synthesis gas to oxygenates involves heat development in that both the conversion of synthesis gas to oxygenate and the further conversion of oxygenate to gasoline product are exothermic processes.

The production of gasoline by the integrated process scheme is also discussed in U.S. Pat. No. 4,481,305. Hydrocarbons and especially as gasoline are prepared by catalytic conversion in two subsequent reactors of a synthesis gas containing hydrogen and carbon oxides and having a mole ratio $CO/H_2$ above 1 and when the conversion commences a mole ratio $CO/CO_2$ of 5 to 20. Synthesis gas is converted with high efficiency in a first step into an oxygenate intermediate comprising predominantly dimethyl ether (DME) said mixture being converted in a second step into gasoline by the net reaction scheme

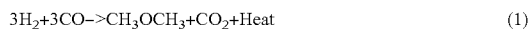

$$3H_2 + 3CO \rightarrow CH_3OCH_3 + CO_2 + \text{Heat} \quad (1)$$

$$CH_3OCH_3 \rightarrow 1/n(CH_2)_n + H_2O + \text{Heat} \quad (2)$$

$(CH_2)_n$ represents the wide range of hydrocarbons produced in the gasoline synthesis step. After separation of the hydrocarbon product, unconverted synthesis gas comprising hydrogen and carbon oxides is recycled to the oxygenate synthesis step after $CO_2$ is at least partly removed, e.g. in a $CO_2$ wash.

SUMMARY OF THE INVENTION

The general object of the invention is to provide an improved integrated process scheme for the preparation of valuable hydrocarbons, boiling in the gasoline rang from carbon monoxide rich synthesis gas, and an intermediate oxygenate synthesis, without the requirement that $CO_2$ be removed from the synthesis gas feed stream and the intermediate oxygenate synthesis product.

The invention is based on the finding that separation of carbon dioxide under pressure is favourably easier from a liquid phase than from a gaseous phase and the further observation that larger amounts of carbon dioxide have no detrimental effect on the reaction of oxygenates to higher hydrocarbons.

Consequently, the invention provides in its broadest embodiment a process for the preparation of hydrocarbon products comprising the steps of (a) providing a synthesis gas comprising hydrogen, carbon monoxide and carbon dioxide;

(b) reacting at least part of the synthesis gas to an oxygenate mixture comprising methanol and dimethyl ether in presence of one or more catalysts which together catalyse a reaction of hydrogen and carbon monoxide to oxygenates at a pressure of at least 3 MPa;

(c) withdrawing from step (b) a reaction mixture comprising amounts of methanol, dimethyl ether, carbon dioxide and water together with unreacted synthesis gas and cooling the reaction mixture to obtain a liquid phase with the amounts of methanol, dimethyl ether and water and simultaneously dissolving carbon dioxide in the liquid phase;

(d) separating the carbon dioxide containing liquid phase from a remaining gaseous phase comprising hydrogen and carbon monoxide;

(e) evaporating and reacting the liquid phase being withdrawn from step (d) in presence of a catalyst being active in the conversion of oxygenates to higher hydrocarbons and a tail gas comprising carbon dioxide;

(f) separating tail gas from a liquid phase with the higher hydrocarbons; and wherein pressure employed in step (c) to step (f) is substantially the same as employed in step (b).

Synthesis gas is preferably adjusted to an H2/CO ratio of about 1, and is reacted in presence of an oxygenate catalyst, including the known methanol catalysts e.g. catalysts with copper, zinc and aluminium oxide combined with a dehydrogenation catalyst comprising a solid acid such as a zeolite, alumina or silica-alumina.

At such CO-rich conditions the water gas shift reaction induces a strong enhancement of conversion due to favourable thermodynamics because water formed in the oxygenate production step is shifted virtually completely by reaction with CO to form hydrogen and carbon dioxide. The net reaction then becomes essentially that of hydrogen+carbon monoxide to DME+CO2.

The synthesis of hydrocarbons and/or fuels such as dimethyl ether, higher alcohols and gasoline are known to co-produce $CO_2$ as a by-product when produced from carbon monoxide rich synthesis gas.

The process according to the invention does advantageously not require any separate upstream or intermediate carbon dioxide removal.

The amounts of carbon dioxides being contained in the synthesis gas and being formed in the oxygenate synthesis, are dissolved in dimethyl ether during the condensation of the product from oxygenate synthesis. Thereby it is possible to separate unconverted synthesis gas from the oxygenate mixture by simple phase separation at the same pressure as prevailing in the oxygenate synthesis step. In contrast to the known processes wherein carbon dioxide is removed from the recycle gas, the process according to the invention results in considerable savings by avoiding carbon dioxide removal from the recycled synthesis gas.

A further advantage of the invention is that the amount of $CO_2$ being present in the synthesis gas feed stream and the amount of $CO_2$ being produced in the synthesis step is recovered at essentially the synthesis pressure prevailing in the oxygenate synthesis step can subsequently be sequestrated without further compression.

Sequestration involves injecting carbon dioxide at high pressure directly into underground geological formations.

Typical operation pressures employed during the synthesis of oxygenates are at least 3 MPa, at which pressures the effluent from the oxygenate synthesis comprising mainly dimethyl ether together with less amounts of methanol, carbon dioxide and unconverted synthesis gas is condensed into a liquid phase. At this pressure, carbon dioxide is readily dissolved in liquid dimethyl ether. A separated gas phase contains hydrogen, carbon monoxide and minor amounts of residual carbon dioxide and dimethyl ether.

The gas phase may either be recycled to the oxygenate synthesis or be passed to combustion e.g. for power production in a later stage.

The content of carbon dioxide in the separated gas phase may further be reduced by washing with dimethyl ether. The washing phase is then subsequently combined with the separated liquid phase prior to evaporation and conversion into gasoline products.

The separated liquid phase containing dimethyl ether and carbon dioxide dissolved in the dimethyl ether optionally combined with the effluent from the above described washing step is evaporated and introduced in the gas phase into a gasoline reactor for the conversion of dimethyl ether and oxygenates further contained in the evaporated liquid phase into a gasoline raw product.

The conversion is performed at substantially the same pressure as employed in the previous oxygenate synthesis and phase separation step in the presence of a catalyst being active in the reaction of oxygenates to higher hydrocarbons, preferably $C_{5+}$ hydrocarbons. A preferred catalyst for this reaction is the known zeolite H-ZSM-5.

As further an advantage of the invention, the content of carbon dioxide having a high heat capacity ($C_p$=48 J/K/mol) acts as a heat sink being favourable in the exothermic gasoline reaction, resulting in a reduced amount of recycle compared to known oxygenate to gasoline processes.

The reaction effluent from the gasoline reactor contains mainly $C_{5+}$ hydrocarbons and carbon dioxide together with minor amounts of lower hydrocarbons and water.

By cooling and condensation a liquid phase of water, a liquid phase of mixed gasoline and LPG is obtained, referred to as raw gasoline.

A fraction of higher-boiling gasoline components ($C_{8+}$) may be separated by conventional means.

The raw gasoline is subjected to further separation steps, wherein the gasoline product consisting of $C_{5+}$ hydrocarbons is separated from a gaseous phase with the amount of the carbon dioxide and the lower hydrocarbons ($C_1$-$C_4$) and contained in the effluent.

Lower hydrocarbons being present on the gaseous phase may be removed by washing with heavy gasoline withdrawn from separation step or may be combusted to carbon dioxide in a combustor or by both measures.

In still an embodiment of the invention, dimethyl ether being used as washing agent for the reduction of residual amounts of carbon dioxide being present in the gaseous phase of the effluent from the oxygenate synthesis is recovered by a wash with heavy gasoline recycled from the first separation step of the gasoline reactor effluent.

BRIEF DESCRIPTION OF THE DRAWINGS

The above disclosed features and aspects of the present invention will be explained in more detail in the following example by reference to the drawings, in which.

DETAILED DESCRIPTION OF THE PREFERRED EMBODIMENTS

Figure 1:
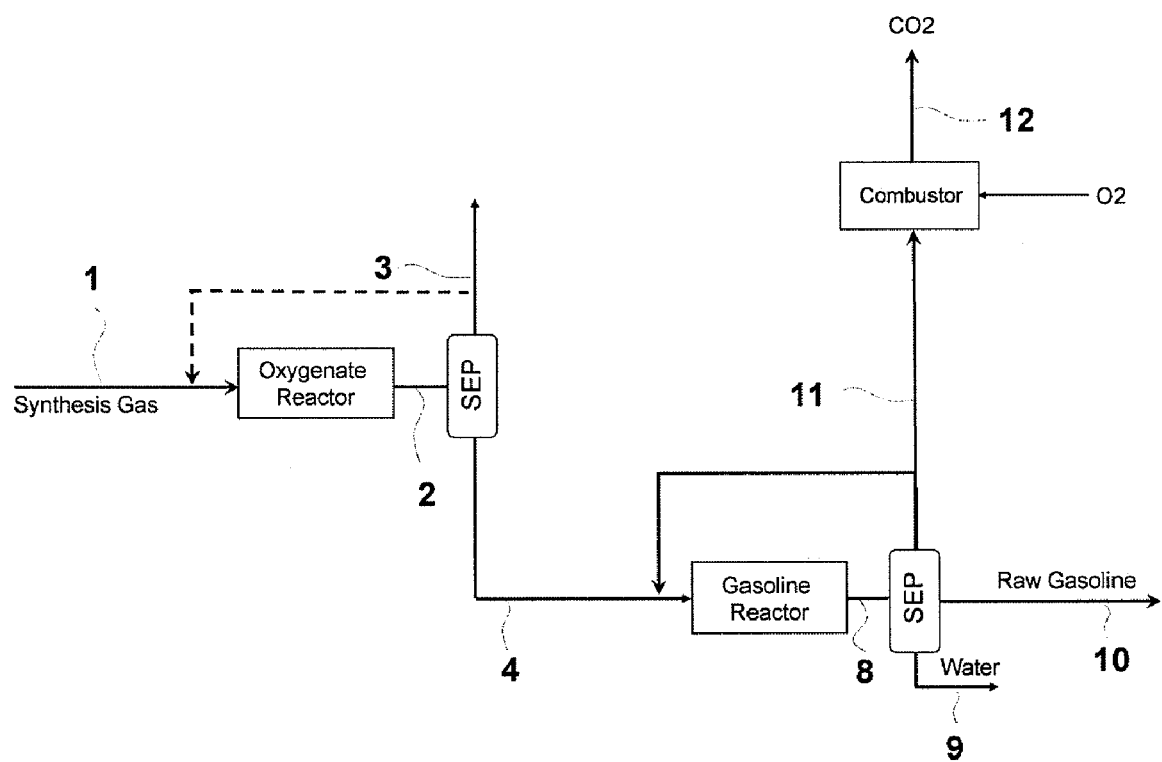
FIG. 1 shows a flow scheme of a specific embodiment of the invention.

Referring now to FIG. 1 and Table 1, below, a synthesis gas with the composition according to entry 0 of Table 1 having an H2:CO ratio of less than one is admixed with steam and shifted in accordance with common practice, to obtain 27918 Nm3/h of module-adjusted synthesis gas 1 which is pressurized to 100 bar g and fed to a boiling water oxygenate reactor to produce a reaction mixture 2 rich in DME and $CO_2$ at an exit temperature of 258° C. The effluent from the oxygenate reactor is cooled to 0° C., causing the effluent to separate into a gaseous phase 3, lean in DME, and a liquid phase 4 consisting essentially of DME and dissolved $CO_2$. Part of the gaseous phase 3 lean in DME may optionally be recycled to the oxygenate reactor to increase the overall conversion of hydrogen and carbon monoxide. Stream 4 is fed to the gasoline reactor where it is converted into a mixture 8 of water, heavier hydrocarbons, $C_5$ to $C_{11}$ being useful as gasoline, and light hydrocarbons, mainly $C_3$ to $C_4$ hydrocarbons (LPG). By cooling and condensation is obtained a liquid phase of water 9, a liquid phase of mixed gasoline and LPG, referred to as raw gasoline 10, and a gaseous phase 11 consisting essentially of $CO_2$ and light hydrocarbons. Part of the gaseous phase 11 is recycled to the gasoline reactor in order to dilute the oxygenate feed concentration at the gasoline reactor inlet, thus serving as a means of reducing the exothermic of the gasoline reactor. The reactor may in the alternative be cooled by other means known in the art. The remainder of the gaseous phase 11 is passed to a combustor where combustible residues comprising hydrogen, carbon monoxide and noncondensable hydrocarbons are burned to produce a resulting stream 12 of $CO_2$, containing minor amounts of water and inerts. Stream 12 is subsequently cooled at the prevailing pressure to produce a liquid aqueous phase and a gaseous phase consisting of essentially pure $CO_2$ and non-combustible inerts such as $N_2$ in amounts according essentially to the amounts of $N_2$ initially present in the synthesis gas 1.

Example 1 demonstrates that a synthesis gas having a $H_2$:CO ratio lower than unity, after adjusting the $H_2$:CO ratio to approximately 1 by the water gas shift reaction may be converted into fuel-grade hydrocarbons, such as gasoline and LPG, with high efficiency without prior removal of $CO_2$. At the same time this example demonstrates that a significant part of the $CO_2$ originally present in the synthesis gas as well as the $CO_2$ formed by adjusting the module by the water gas shift reaction prior to entering the oxygenate synthesis and the $CO_2$ formed in the oxygenate synthesis may be recovered at high pressure, similar to the synthesis pressure except for parasitic losses due to pressure drop etc. Being recovered at elevated pressure the $CO_2$ is ready for sequestration as opposed to known processes for $CO_2$ capture in which the $CO_2$ is released at reduced pressure, requiring compression in order to be sequestered. It is clear from Example 1 that any synthesis gas having a $H_2$:CO ratio equal to or less than one provides a suitable source for the synthesis described in the Example, but also gases with $H_2$:CO ratios higher than unity may be applied.

TABLE 1

| Composition (mol %) | Stream No. | | | | | | | | | |
|---|---|---|---|---|---|---|---|---|---|---|
| | 0 | 1 | 2 | 3 | 4 | 8 | 9 | 10 | 11 | 12 |
| H2 | 34.0 | 42.2 | 11.5 | 28.5 | 1.3 | 1.1 | | 0.0 | 2.0 | |
| CO | 63.0 | 42.2 | 13.6 | 28.6 | 4.5 | 4.0 | | 0.1 | 7.3 | |
| CO2 | 1.0 | 13.5 | 47.4 | 33.6 | 55.7 | 49.6 | | 26.7 | 84.6 | 99.0 |
| N2 | 2.0 | 1.7 | 3.3 | 7.8 | 0.6 | 0.6 | | 0.0 | 1.1 | 1.0 |
| H2O | | 0.3 | 0.8 | | 1.3 | 33.8 | 100.0 | | 0.0 | |
| DME | | | 21.8 | 1.5 | 34.1 | 0.0 | | | | |
| MeOH | | | 1.6 | 0.0 | 2.5 | 0.0 | | | | |
| C3 | | | | | | 0.8 | | 0.0 | 1.6 | |
| C4 | | | | | | 2.4 | | 6.7 | 3.3 | |
| C5+ | | | | | | 7.7 | | 66.2 | 0.0 | |
| Nm3/h | 24392 | 27918 | 14563 | 5516 | 9047 | 10143 | 3430 | 1163 | 5538 | 6163 |
| kg/h | | | | | | | | 3973 | | 12098 |

1) Mole weight (C5+) = 92.2 (average)
2) Stream 12: Composition on dry basis

Figure 2:
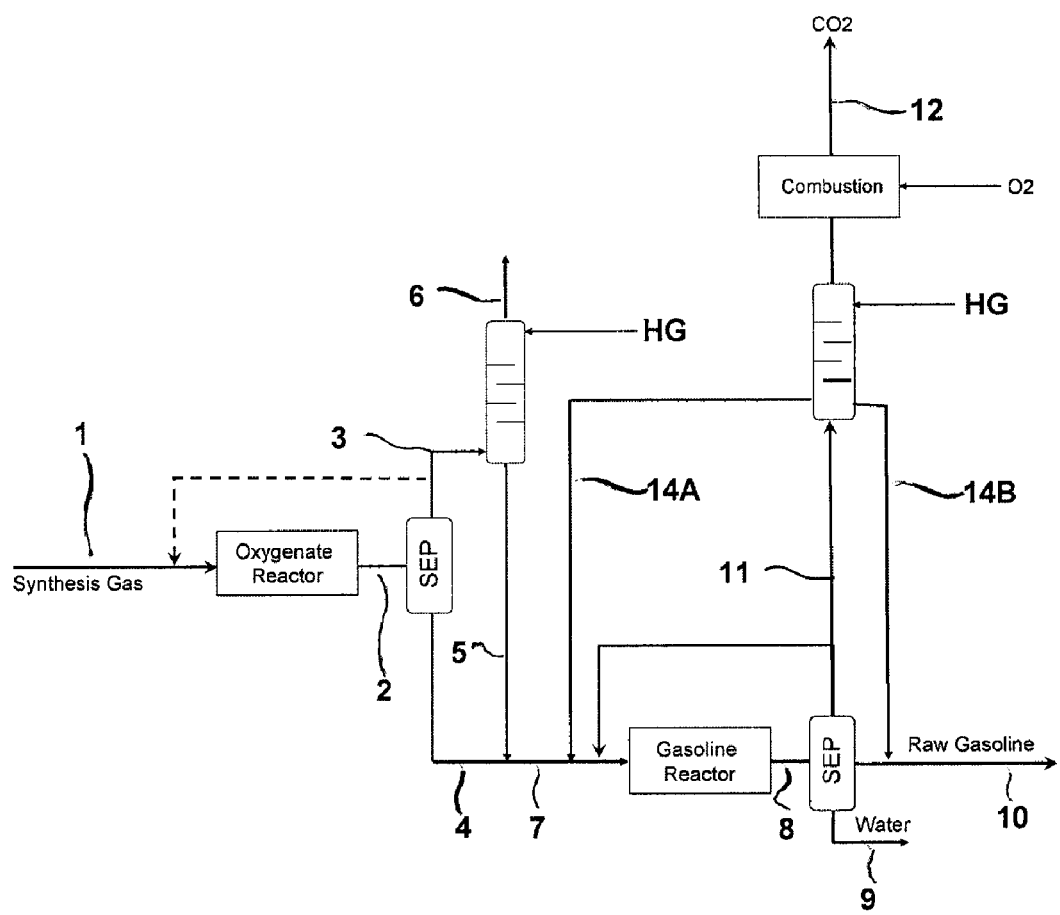
FIGS. 2 and 3 represent further embodiments of the invention.

Another specific embodiment of the invention is shown in FIG. 2, which is similar to FIG. 1, but has the additional feature that DME and/or hydrocarbon values of the streams 6 and 11, respectively, is recovered by contacting the respective streams with a liquid washing agent, preferably in a countercurrent mode. As washing agent may conveniently be used the higher-boiling part of the gasoline product: From the stream 10 of raw gasoline may be separated by conventional means (not shown in FIG. 2), a fraction of higher-boiling gasoline components, "heavy gasoline" (HG) suitable as a washing agent for the recovery of DME values contained in the vent gas stream 3 to produce a resulting liquid stream 5 which is admixed into oxygenate stream 4 to produce stream 7. The resultant stream 7, formed by the combined streams 4 and 5, is fed to the gasoline reactor where it is converted, as described in Example 1, into a mixture 8 of water, heavier hydrocarbons and light hydrocarbons and a gaseous phase 11 consisting essentially of $CO_2$ and light hydrocarbons and which may be partly recycled to the gasoline reactor for temperature control purposes.

Heavy gasoline (HG) may also be used for the recovery of light hydrocarbons in the vent gas stream 11. The liquid stream of heavy gasoline and hydrocarbon residues from 11 dissolved therein 14A may be combined with the oxygenate-containing feed stream 7 to the gasoline reactor and/or it may be combined 14B directly with the raw gasoline product stream 10.

This embodiment achieves the same primary objective as described in Example 1, namely recovery of $CO_2$ at elevated pressure being ready for sequestration, but with the additional feature that additional amounts of DME and hydrocarbon values are recovered.

Figure 3:
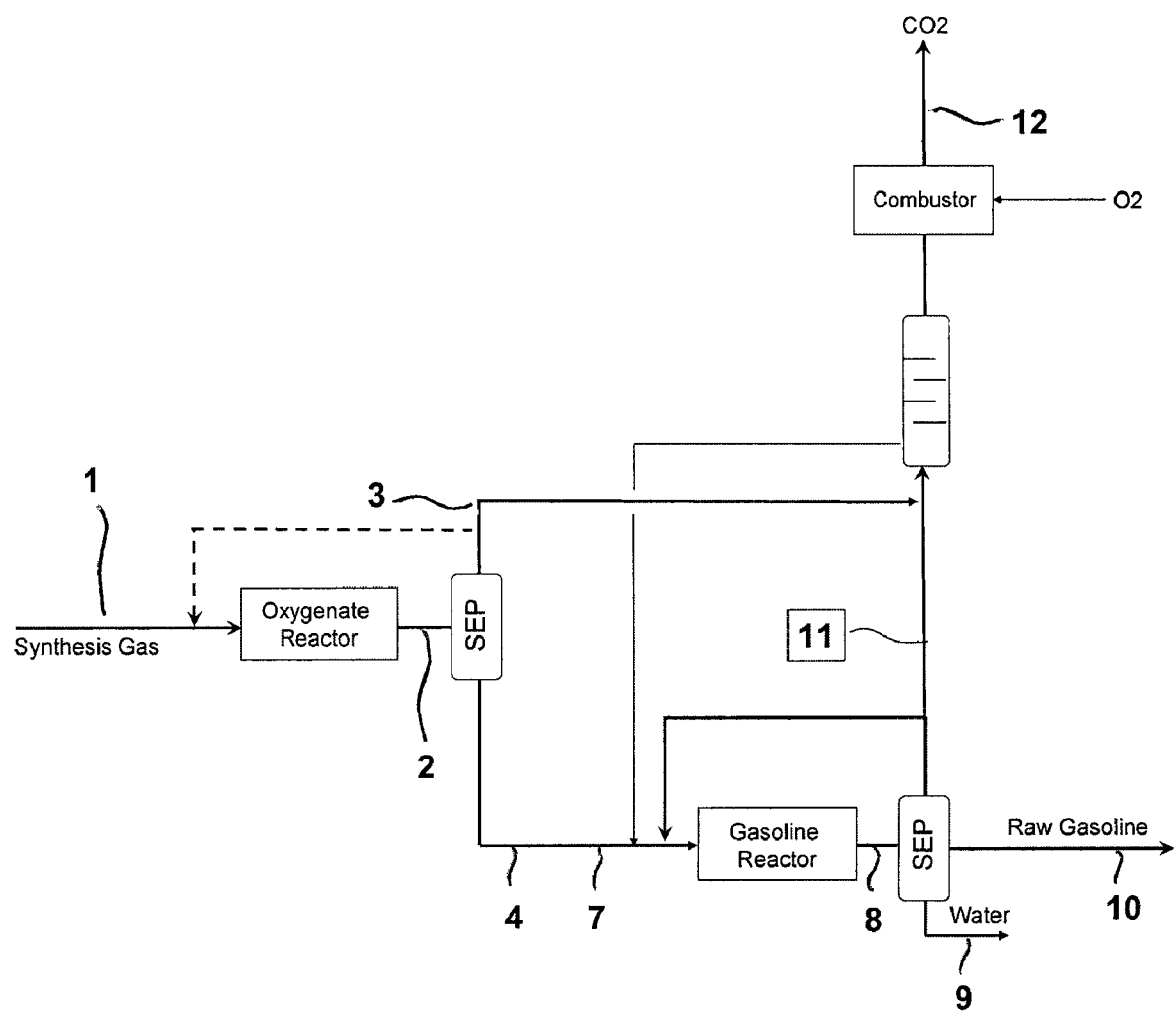

FIG. 3 illustrates a further embodiment of the invention. In this embodiment pertaining the heavy gasoline washing steps of FIG. 2 are combined into a single washing step by combining the vent gas streams 3 and 11 prior to the washing steps. According to this embodiment the re-suiting liquid stream 14, containing heavy gasoline and DME and hydrocarbon residues dissolved herein, is combined with oxygenate-containing feed stream 4 to produce the resulting stream 7 being fed to the gasoline reactor. According to this embodiment almost complete recovery of $CO_2$ at elevated pressure is obtained.

What is claimed is:

1. A process for the preparation of hydrocarbon products comprising the steps of
   (a) providing a synthesis gas comprising hydrogen, carbon monoxide and carbon dioxide;
   (b) reacting at least part of the synthesis gas to an oxygenate mixture comprising methanol and dimethyl ether in presence of one or more catalysts which together catalyse a reaction of hydrogen and carbon monoxide to oxygenates at a pressure of at least 3 MPa;
   (c) withdrawing from step (b) a reaction mixture comprising amounts of methanol, dimethyl ether, carbon dioxide and water together with unreacted synthesis gas and cooling the reaction mixture to obtain a liquid phase with the amounts of methanol, dimethyl ether and water and simultaneously dissolving carbon dioxide in the liquid phase;
   (d) separating the carbon dioxide containing liquid phase from a remaining gaseous phase comprising hydrogen and carbon monoxide;
   (e) reacting the liquid phase being withdrawn from step (d) in presence of a catalyst being active in the conversion of oxygenates to higher hydrocarbons and a tail gas comprising carbon dioxide;
   (f) separating tail gas from a liquid phase with the higher hydrocarbons;
   wherein pressure employed in step (c) to step (f) is substantially the same as employed in step (b) and wherein at least part of the gaseous phase obtained in step (d) is recycled to step (b).

2. The process of claim 1, wherein the gaseous phase obtained in step (f) is washed with heavy gasoline 3. The process of claim 1, wherein the gaseous phase obtained in step (d) is washed with heavy gasoline 4. The process of claim 1, wherein the gaseous phase obtained in step (d) is washed with dimethyl ether.

5. The process of claim 4, wherein the gaseous phase after washing with dimethyl ether is further washed with heavy gasoline.

6. The process of claim 1, wherein part of the gaseous phase obtained in step (d) is combined with the tail gas from step (f).

7. The process of claim 6, wherein the combined tail gas is washed with heavy gasoline and wherein the heavy gasoline after having been used as washing agent is combined with the liquid phase from step (d).

8. The process of claim 1, wherein part of the tail gas from step (f) is recycled to the liquid phase from step (d).

9. The process according to claim 1, wherein at least part of the tail gas from step (f) is subjected to combustion.

10. The process according to claim 1, wherein the tail gas from step (f) is sequestered.

* * * * *